United States Patent [19]

Komatsu

[11] Patent Number: 5,064,137
[45] Date of Patent: Nov. 12, 1991

[54] FIXED TORQUE SPRING CLUTCH AND A WINDER HAVING THE SAME

[76] Inventor: Fumito Komatsu, 1632-12, Nomura, Ooaza Hirooka, Shiojiri-shi, Nagano-ken, Japan

[21] Appl. No.: 516,595

[22] Filed: Apr. 30, 1990

[30] Foreign Application Priority Data

May 9, 1989 [JP] Japan .................................. 1-115697

[51] Int. Cl.⁵ ...................... B65H 16/10; G11B 15/32; F16D 11/06
[52] U.S. Cl. .................................. 242/201; 242/68.3; 192/41.005; 192/81 C
[58] Field of Search ....................... 242/200, 201, 68.1, 242/68.3; 464/57, 58, 60; 192/415, 26, 81 C

[56] References Cited

U.S. PATENT DOCUMENTS

| | | | |
|---|---|---|---|
| 2,723,013 | 11/1955 | Roger et al. | 192/415 |
| 2,833,383 | 5/1958 | Christensen | 192/415 X |
| 2,922,220 | 1/1960 | Sacchini | 192/81 C |
| 3,442,359 | 5/1969 | Atchison | 192/415 X |
| 4,133,497 | 1/1979 | Rothlisberger | 242/201 X |
| 4,527,683 | 7/1985 | Mathews | 192/415 X |
| 4,830,151 | 5/1989 | Numata | 192/415 X |

Primary Examiner—Daniel P. Stodola
Assistant Examiner—John P. Darling
Attorney, Agent, or Firm—Jordan and Hamburg

[57] ABSTRACT

The fixed torque spring clutch of the present invention has a first rotor and a second rotor. The rotation of one rotor can be transmitted to the other rotor by a coil spring. The first rotor has a shaft section, the coil spring has a clamping section winding round the shaft section, and a non-clamping section arranged in spaced circumferential relation with the outer face of the shaft section. The second rotor has a holding piece and releasing piece arranged in spaced circumferential relation thereon. The holding piece engages the non-clamping section of the coil spring to increase the torque it applies to the shaft section. The releasing piece then engages the clamping section of the coil spring to decrease the torque it applies to the shaft section. The cooperating action of the holding piece and releasing piece on, respectively, the non-clamping and clamping sections of the coil spring results in maintenance of a prescribed fixed torque on the shaft section. The first rotor constitutes a driving member and the second rotor a load, or vice versa. The fixed torque spring clutch can be utilized in a winder such as a tape recorder winder.

20 Claims, 4 Drawing Sheets

FIXED TORQUE SPRING CLUTCH AND A WINDER HAVING THE SAME

BACKGROUND OF THE INVENTION

The present invention relates to a fixed torque spring clutch and a winder having a fixed torque spring clutch.

Various types of fixed torque clutches have been known. Their structure must be complex in order to produce fixed torque accurately.

A conventional spring clutch is shown in FIG. 8. A coil spring 14 is wound on a rotary shaft 30. The rotation of the rotary shaft 30 in the direction of tightening the coil spring 14 is prevented; the rotation in the counter direction is allowed for fixed-torque rotation.

A reel base of a cassette tape recorder is shown in FIG. 9. A head-cap 22 and a gear 23 for fast forwarding tape are assembled and fixed on a rotary shaft 24 into which a fixed shaft is inserted. The rotary shaft 24 is inserted through a gear 25, which is transmitted driving force from a motor built in a tape recorder proper, with a play, and the gear 25 is pressed to contact a felt 28 and the gear 23 by a spring 27.

While recording and playing the tape recorder, the gear 25 is rotated at fixed speed to rotate the head-cap 22, the felt 28 and the gear 23 and a tape is wound round a reel of a cassette. The tape is advanced at fixed speed by a pinch roller, so that the gear 25 is rotated at fixed speed so as not to slacken the tape when the tape starts to move when no tape is wound round the reel of the cassette.

When the winding load becomes greater than the frictional force among the felt 28 and the gears 23 and 25, the gear 25 slips on the felt 28, so that unnecessary tension does not work on the tape and the tape can be wound without slackening.

The spring clutch shown in FIG. 8 is widely used in many fields because it has a small number of parts and simple structure.

The torque characteristic of the conventional spring clutch depends on the winding number of the coil spring 14, the diameter (inner diameter) of the coil spring with respect to the rotary shaft, etc.

In the manufacturing process of the coil spring, it is not easy to accurately wind with uniform diameter. Therefore, the spring clutch having this coil spring can be used with fixed torque but it is practically impossible to unite the torque characteristic of many spring clutches, so that many spring clutches below standard are produced.

In the reel base, in which a fixed torque is obtained by dynamic friction among the felt and other members, shown in FIG. 9, the coefficient of friction changes with the temperature and the humidity, so that the slip dynamic torque is unstable; the coefficient of friction also changes with abrasion of the felt, so that the slip dynamic torque also changes with the abrasion. Further, the coefficient of friction is sometimes changed by oil lubricated to the rotatable section, slidable section, etc. Additionally, there is no means for adjusting the slip dynamic torque, so that there is a possibility of manufacturing many clutches below the standard, and manufacturing cost including costs for parts and assembling is raised because of the complex structure.

SUMMARY OF THE INVENTION

The present invention aims to solve the above described problems. The object of the present invention is to provide an inexpensive fixed torque spring clutch, which can generate stable torque.

Another object of the present invention is to provide an inexpensive winder, especially a reel base of a cassette tape recorder, which can generate stable torque, with a simple structure.

The fixed torque coil spring clutch of the present invention basically includes, a first rotor, a second rotor, a coil spring attached to a shaft section which is provided to one of the first rotor and the second rotor, the coil spring having a clamping section which can wind round to clamp the shaft section and a non-clamping section whose end is held at the other rotor and which is separated away from the outer face of the shaft section, and a releasing piece provided to the other rotor, the releasing piece contacting the end of the clamping section of the coil spring from the direction of releasing the clamping force with respect to the shaft section when the first rotor and/or second rotor rotates from the direction of increasing the torque of the non-clamping section of the coil spring with respect to the shaft section for a prescribed angle.

In the present invention, the clamping section of the coil spring winds round to clamp the shaft section; the end of the non-clamping section is held at the first rotor or the second rotor, so that the torque in the non-clamping section rises according to the spring characteristic when the first or second rotor relatively rotates in the prescribed direction. As soon as the releasing piece contacts the clamping section, the clamping section is loosened but the torque of the non-clamping section further rises while the clamping force of the clamping section is greater than the torque of the non-clamping section. Once both are balanced, the clamping section slips on the shaft section, and the torque fixed thereafter.

The torque generated in the non-clamping section mainly becomes the whole torque; the torque generated in the clamping section is relatively small, so that the dispersion of the torque of the spring clutches can be suppressed smaller even if the diameter of the clamping section thereof is dispersed.

BRIEF DESCRIPTION OF THE DRAWINGS

Further objects and advantages of the present invention will be apparent from the following description, reference being had to the accompanying drawings wherein preferred embodiments of the present invention are clearly shown.

In the drawings.

DESCRIPTION OF THE PREFERRED EMBODIMENTS

Preferred embodiments of the present invention will now be described in detail with reference to the accompanying drawings.

Figure 1:
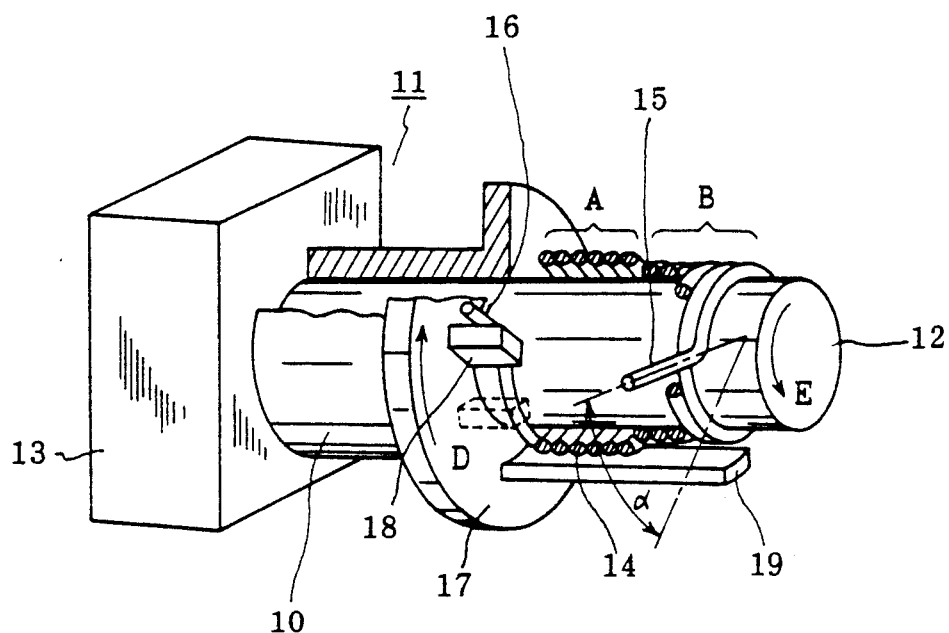
FIG. 1 is a partially cutaway view in perspective of a fixed torque spring clutch of the present invention.

FIG. 1 is a partially cutaway view in perspective of a fixed torque spring clutch of the present invention.

In FIG. 1, numeral 10 is a first rotor as a driving member; numeral 11 is a second rotor as a load.

The second rotor 11 has a shaft section 12. When the first rotor 10 rotates in prescribed direction, the second rotor 11 rotates in the same direction. To easily understand, the shaft section 12 which is fixed at a fixed section 13 will be explained.

A coil spring 14 is wound on the outer circumferential face of the shaft section 12. The coil spring has a clamping section B, which winds to clamp the outer circumferential face of the shaft section 12, and a non-clamping section A, which is joined to the clamping section and whose inner face is separated away from the outer circumferential face of the shaft section 12. Each of clamping section B and non-clamping section A has an end respectively bent outward to form engage sections 15 and 16.

The first rotor 10, which is cylindrical in shape, has a flange 17, and can be rotated on the shaft section 12. The first rotor 10 is rotated by a driving unit e.g. a motor. There are projected a holding piece 18, which contacts the engage section 16 of the coil spring 14 with the rotation of the first rotor 10, and a releasing piece 19, which contacts the engage section 15 with the rotation thereof, on the upper face of the flange 17 of the first rotor 10. When the first rotor 10 rotates in the direction D, the holding piece 18 contacts the engage section 16 from the direction of winding the non-clamping section A of the coil spring 14 to reduce its diameter. The engage section 15 of the clamping section B and the releasing piece 19 are separated by an angle $\alpha$ at that time, and the releasing piece 19 is designed to contact the engage section 15 from the direction of loosening the clamping force of the clamping section B to the shaft section 12 when the first rotor 10 further rotates in the direction D for about the angle $\alpha$.

Next, the function of the spring clutch will be explained.

The holding piece 18 contacts the engage section 16 and presses it in the direction D when the first rotor 10 rotates in the direction D. Then the releasing piece 19 rotates behind the engage section 15 for the angle $\alpha$, so that the releasing piece 19 does not contact the engage section 15. Therefore, the clamping section B is winding round the shaft section 12 to clamp, and the non-clamping section A is reduced in diameter when the holding piece 18 presses the engage section 16. The torque working on the shaft section 12 linearly increases according to the spring constant of the coil spring 14 shown as area o-g of the thick line in FIG. 2.

The first rotor 10 further rotates and the releasing piece 19 contacts the engage section 15, then the releasing piece 19 presses the engage section 15 in the direction of loosening the clamping force of the clamping section B. But the torque of the non-clamping section A further rises while the clamping force of the clamping section B is greater than the torque of the non-clamping section A (g-b). The clamping section B begins to slip on the shaft section 12 when the clamping force of the clamping section B and the torque of the non-clamping section A is balanced at the point c, so that the spring clutch generates fixed torque from then on.

Figure 2:
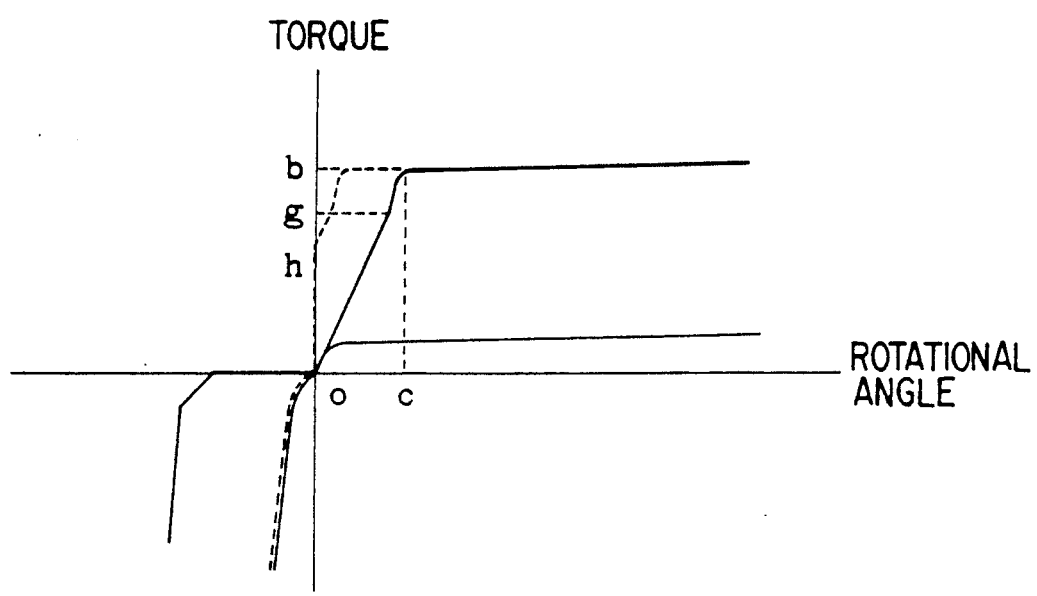
FIG. 2 is a graph of the torque characteristic of the spring clutch of FIG. 1.
Figure 8:
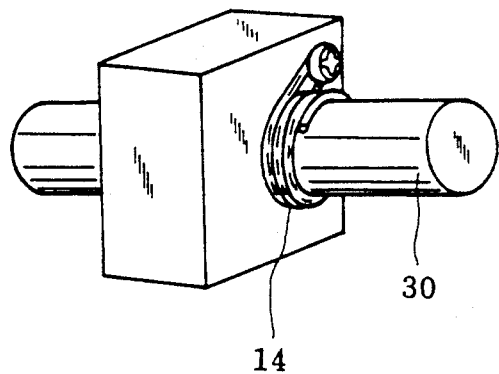
FIG. 8 is a perspective view of a conventional spring clutch.
Figure 9:
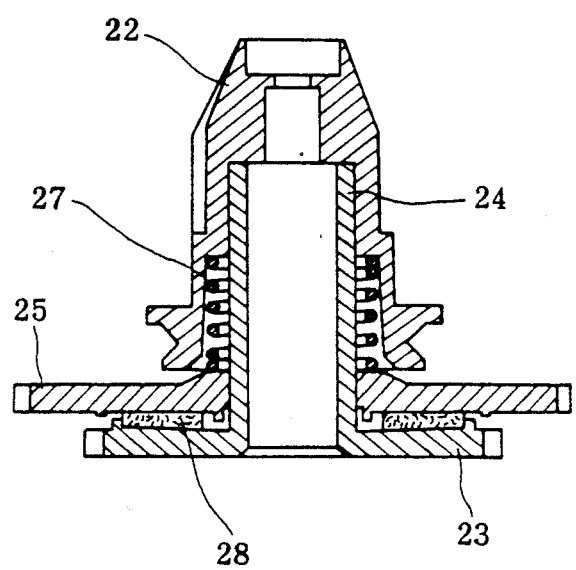
FIG. 9 is a sectional view of a conventional reel base.

The torque characteristic after the releasing piece 19 contacts the engage section 15 is almost the same as the torque characteristic of the conventional spring clutch, shown by the thin line in FIG. 2, of FIG. 8.

As clearly shown in FIG. 2, in this embodiment, raising the torque of the spring clutch until achieving fixed torque mainly depends on raising the torque of the non-clamping section A.

In the conventional spring clutch shown in FIG. 8, the torque depends on the torque of the section, which corresponds to the clamping section of this embodiment, only. Therefore, when the accuracy of the diameter of the coil spring is low, namely the clamping force is unstable, the torque characteristic is directly affected and stable torque cannot be gained, so that the spring clutch of this type has not practically been used as a fixed torque spring clutch.

From this point of view, in this embodiment, even if the accuracy of the diameter of the clamping section B is low, the influence of the torque of the clamping section B to the whole torque characteristic of the fixed torque spring clutch is comparatively low as described above, the dispersion of the torque characteristic of fixed torque spring clutches can be suppressed, and fixed torque spring clutches having stable torque characteristics can be realized.

Using a coil spring whose points g and b in FIG. 2 are close, the influence of the clamping section B can be further lowered, so that the dispersion of the torque of the spring clutches can be further suppressed. This means that the initial clamping force of the clamping section B is small but the force working on the non-clamping section A gradually transmitted to the clamping section B to increase the clamping force of the clamping section B after the holding piece 18 contacts the engage section 16. The clamping section B does not slip on the section 12, and the clamping section B is immediately loosened after the releasing piece 19 contacts the engage section 15 because the initial clamping force of the clamping section B is low, so that the influence of the clamping section B can be suppressed.

Note that, in FIG. 1, if the first rotor 10 rotates in the counter direction of the direction D, the releasing piece 19 contacts the engage section 15 from the counter direction after prescribed rotation, and then releasing piece 19 further clamps the clamping section B to stop the rotation of the first rotor 10.

In the above described embodiment, the first rotor 10 is rotated by a drive unit but the shaft section 12 of the second rotor 11, of course, may be rotated in the direction E of FIG. 1 by the drive unit. In this case, the second rotor 11 is the driving member; the first rotor 10 is the load.

As described above, the torque of the non-clamping section A mainly affects the whole torque characteristic of the clutch. Therefore, the whole torque can be adjusted by adjusting the separation angle between the holding piece 18 and the releasing piece 19. To adjust the separation angle, as shown by dotted lines in FIG. 1, a plurality of holding pieces 18 may be arranged in the rotational direction at prescribed intervals.

Note that, the engage section 16 may be fixed to the holding piece 18 or the first rotor 10.

In the present invention, the concept of the word "hold" includes as described above, "fix" and "contact".

In the above described embodiment, the torque of the spring clutch rises from zero and the torque first reaches the prescribed torque at point c. For another use, a smaller angle of rotation, for which the torque reaches the prescribed value, will be required. In this case, the rotational angle until the torque reaches the prescribed value can be small by increasing the spring constant of the coil spring, but the prescribed value of the torque will be easily affected by the accuracy of the parts of the spring clutch, so it is improper.

Figure 3:
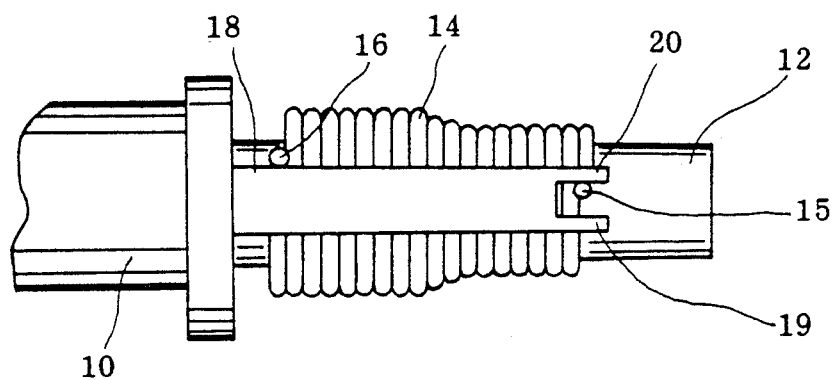
FIG. 3 is a partial front view of another embodiment.

To solve this disadvantage, the holding piece 18 and the releasing piece 19 are arranged comparatively close so as to make the rotational angle between both small, as shown in FIG. 3. A stopper 20 of the engage section 15, whose location in the rotational direction is located between the locations of the holding piece 18 and the releasing piece 19, is located close to the releasing piece 19. Further, the non-clamping section A of the coil spring 14 is located between the holding piece 18 and the stopper 20 and is wound to have a torque which is slightly smaller than the prescribed torque. With this structure, as shown in FIG. 2, the first rotor 10 starts to rotate, simultaneously the torque begins to rise from the point h until the point b and reaches the prescribed value, so that the torque can reach the prescribed value with a small rotational angle. Note that, in this case, the stopper 20 immediately contacts the engage section 15 to stop the rotation when the first rotor 10 rotates in the counter direction, so that this spring clutch has the function of preventing the counter rotation as does the conventional spring clutch shown in FIG. 8.

Figure 4:
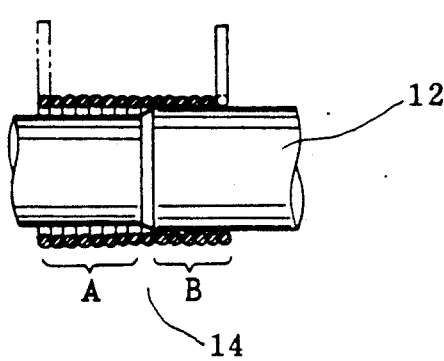
FIG. 4 is a partial sectional view of another embodiment whose shaft section has a step.

In the above described embodiment, the diameter of the non-clamping section A of the coil spring 14 is designed to be larger than the diameter of the clamping section B thereof. The diameter of the non-clamping section A and the clamping section B may be the same as shown in FIG. 4, but, in this case, the diameter of the part of the shaft section, which corresponds to the non-clamping section A, should be smaller than the diameter of the non-clamping section A so as to mutually separate away.

Figure 5:
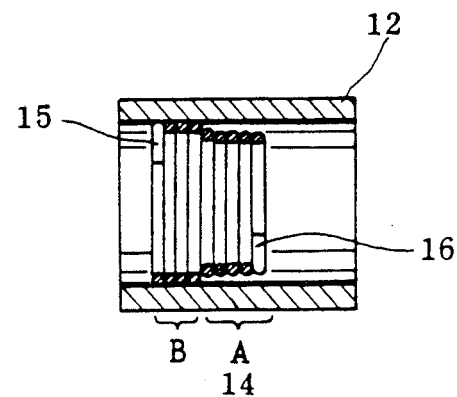
FIG. 5 is a partial sectional view of another embodiment whose coil spring is attached in the shaft section.

Further, as shown in FIG. 5, the shaft section 12 is formed in a cylindrical shape, and the coil spring 14, whose clamping section B is larger than the non-clamping section A, may be inserted thereinto. In this case, the engage sections 15 and 16 are bent inward to be able to contact the holding piece and the releasing piece of the first rotor (not shown). Note that, in this embodiment, the holding piece works on the non-clamping section A in the counter direction of the former embodiment so as to loosen; the releasing piece works on the clamping section B so as to clamp.

Figure 6:
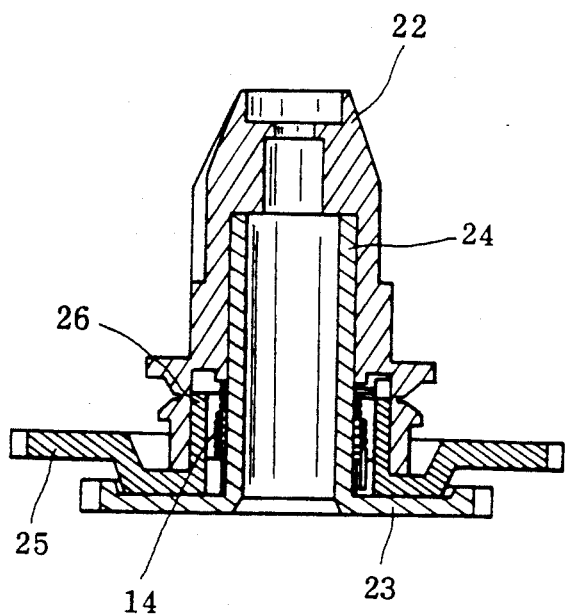
FIG. 6 is a sectional view of another embodiment in which the spring clutch is applied to the reel base.

Next, another embodiment in which the fixed torque spring clutch is applied to a cassette tape recorder will be explained with reference to FIGS. 6 and 7.

A head-cap 22 and a fast-forward gear 23 are assembled and fixed on a rotary cylinder 24. The head-cap 22 is the second rotor.

A gear is driven by a motor built in a tape recorder proper (not shown). A cylinder 26 is made to stand at the center of the gear 25, and the cylinder 26 is slidably fitted in the space between the outer face of the rotary cylinder 24 and the inner face of the base section of the head-cap 22. With this structure, the gear 25 can be rotated on the rotary cylinder 24.

The coil spring 14 is attached on the rotary cylinder 24, and the clamping section B winds round the rotary cylinder 24 to clamp. The engage section 15 of the clamping section B can be contacted by the releasing piece 19 formed on the end face of the cylinder 26; the engage section 16 of the non-clamping section A can be contacted by a plurality of holding pieces 18 formed on the inner face of the cylinder 26 (see FIG. 7).

Therefore, the gear 25 is driven by the motor built in the tape recorder proper (not shown) to rotate during recording or playing, and the head-cap 22 is rotated with the holding piece 18, the engage section 16 and the coil spring 14, so that a reel in a cassette, which is set in the tape recorder proper, is rotated to wind a tape. In this operation, the head-cap 22 is rotated with fixed torque and the tape wound is given a fixed tension.

The torque of the non-clamping section A can be easily adjusted by selecting the holding piece 18 which the engage section 16 contacts. In this case, through-holes (not shown) may be bored in the gear 23, and if the through-holes are bored to correspond to the holding pieces 18, the holding piece 18 which engages with the engage section 16 can be changed at the user's option through the through-holes even after the reel base is assembled. This structure is very convenient to adjust the torque.

Figure 7:
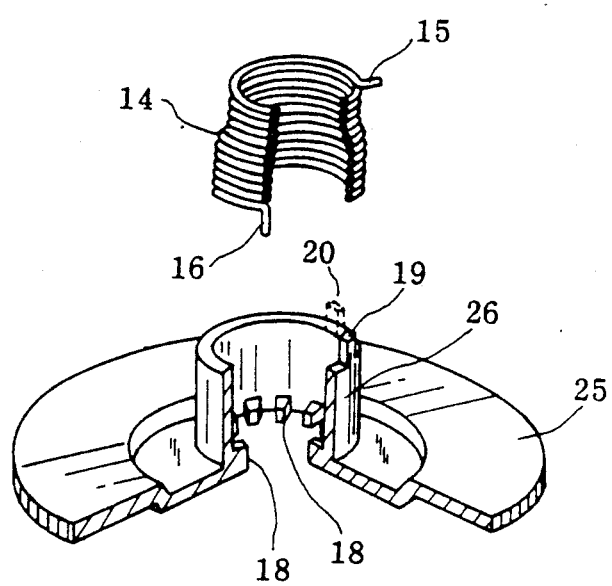
FIG. 7 is an exploded perspective view of the main part of the reel base of FIG. 6.

As shown by dotted lines in FIG. 7, the stopper 20 may be provided on the end face of the cylinder 26 close to the releasing piece 19, the location in the rotational direction of the engage section 15 is located between the locations of the releasing piece 19 and the stopper 20, and the engage section 16 is engaged with the prescribed holding piece 18. This time the non-clamping section A is reduced in diameter. With this structure, fixed torque can be gained with a small angle of rotation.

In this embodiment, the reel base of the cassette tape recorder is employed, but this fixed torque spring clutch can be applied to a transmission system between a winding reel and a drive unit for rotating the reel of various winders for winding a tape, a string, a wire, etc.

Preferred embodiments of the present invention have been described in detail but the present invention is not limited to the above stated embodiments, and many modifications can be allowed without deviating from the spirit of the invention.

As described above, the present invention has the following advantages.

Even if the diameter of coil springs are dispersed, the whole torque of each spring clutch depends on the torque of the non-clamping section, so that the torque characteristic of the spring clutches can be the same.

High accuracy is not required for the parts of the spring clutch, so it is advantageous for mass production, whereby the manufacturing cost can be reduced.

Further, a conventional reel base is composed of five parts; the reel having the fixed torque spring clutch of the present invention is composed of four parts. The number of parts also can be reduced, and an economical reel base can be realized.

What I claimed is:

1. A spring clutch for providing a prescribed fixed torque to a shaft, comprising:
    a first rotor having a shaft section, said shaft section having an outer circumferential surface;
    a coil spring engaging said shaft section, said coil spring including a clamping section engaging said shaft section and a non-clamping section arranged in spaced relation with said shaft section, said clamping section having a first engagement end section and said non-clamping section having a second engagement end section;

a second rotor arranged in cooperative relationship with said first rotor, said second rotor having a holding piece for engaging said second engagement end section to move said non-clamping section of said coil spring into engagement with said shaft section to increase torque applied to said shaft section, and said second rotor having a releasing piece arranged in spaced relation to said holding piece for engaging said first engagement end section to loosen said clamping section of said coil spring to decrease torque applied to said shaft section, said holding piece and said releasing piece cooperating to increase torque applied by said non-clamping section and to decrease torque applied by said clamping section for applying a prescribed fixed total torque by said coil spring to said shaft section.

2. A spring clutch as in claim 1, wherein said coil spring engages the outer circumferential surface of said shaft section.

3. A spring clutch as in claim 2, wherein said clamping section of said coil spring has a first diameter, said non-clamping section of said coil spring has a second diameter, and said second diameter is greater than said first diameter, said non-clamping section of said coil spring thereby being arranged in spaced relation with the outer circumferential surface of said shaft section.

4. A spring clutch as in claim 2, wherein said shaft section includes a first shaft portion having a first diameter, a second shaft portion having a second diameter smaller than said first diameter, and said clamping and non-clamping sections of said coil spring have an equal diameter, said clamping section engaging said first shaft portion and said non-clamping section being arranged in spaced relation with said second shaft portion.

5. A spring clutch as in claim 1, wherein said shaft section is a hollow cylinder having an inner circumferential surface, and said coil spring is arranged in said hollow cylinder in engagement with said inner circumferential surface.

6. A spring clutch as in claim 5, wherein said clamping section of said coil spring has a first diameter, said non-clamping section of said coil spring has a second diameter, and said first diameter is greater than said second diameter, said non-clamping section of said coil spring thereby being arranged in spaced relation with the inner circumferential surface of said shaft section.

7. A spring clutch as in claim 1, wherein said second rotor is arranged for rotation about the shaft section of said first rotor.

8. A spring clutch as in claim 1, wherein said second engagement end section of said non-clamping section of said coil spring is fixed to the holding piece of said second rotor.

9. A spring clutch as in claim 1, wherein said holding piece and said releasing piece are arranged on said second rotor in spaced circumferential relation at a prescribed angle.

10. A spring clutch as in claim 9, said second rotor further comprising stopper means arranged in spaced circumferential relation between said holding piece and said releasing piece, said second engagement end section contacting said holding piece and said first engagement end section contacting said stopper means, said stopper means preventing rotation of said holding piece out of contact with said second engagement end section.

11. A spring clutch as in claim 1, wherein said second rotor has a plurality of holding pieces arranged on said second rotor in spaced circumferential relation, each of said holding pieces being arranged in spaced circumferential relation with said releasing piece at a different prescribed angle.

12. A spring clutch as in claim 1, wherein said first rotor is a driving member and said second rotor is a load.

13. A spring clutch as in claim 1, wherein said second rotor is a driving member and said first rotor is a load.

14. A winder for winding a wound member such as a tape, a string, or a wire, comprising:

a first rotor for transmitting a driving force from a driving source, said first rotor having a shaft section, said shaft section having an outer circumferential surface;

a coil spring engaging said shaft section, said coil spring including a clamping section engaging said shaft section and a non-clamping section arranged in spaced relation with said shaft section, said clamping section having a first engagement end section and said non-clamping section having a second engagement end section;

a second rotor for winding as a winding shaft, said second rotor being arranged in cooperative relationship with said first rotor, said second rotor having a holding piece for engaging said second engagement end section to move said non-clamping section of said coil spring into engagement with said shaft section to increase torque applied to said shaft section, and said second rotor having a releasing piece arranged in spaced relation to said holding piece for engaging said first engagement end section to loosen said clamping section of said coil spring to decrease torque applied to said shaft section, said holding piece and said releasing piece cooperating to increase torque applied by said non-clamping section and to decrease torque applied by said clamping section for applying a prescribed fixed total torque by said coil spring to said shaft section.

15. A winder for winding a wound member such as a tape, a spring, or a wire, comprising:

a first rotor for winding as a winding shaft, said first rotor having a shaft section, said shaft section having an outer circumferential surface;

a coil spring engaging said shaft section, said coil spring including a clamping section engaging said shaft section and a non-clamping section arranged in spaced relation with said shaft section, said clamping section having a first engagement end section and said non-clamping section having a second engagement end section;

a second rotor for transmitting a driving force from a driving source, said second rotor being arranged in cooperative relationship with said first rotor, said second rotor having a holding piece for engaging said second engagement end section to move said non-clamping section of said coil spring into engagement with said shaft section to increase torque applied to said shaft section, and said second rotor having a releasing piece arranged in spaced relation to said holding piece for engaging said first engagement end section to loosen said clamping section of said coil spring to decrease torque applied to said shaft section, said holding piece and said releasing piece cooperating to increase torque applied by said non-clamping section and to decrease torque applied by said clamping section for applying a prescribed fixed total torque by said coil spring to said shaft section.

16. A tape winder for a tape recorder, comprising:
a fast-forward gear having a first axis;
a rotary cylinder mounted on said fast-forward gear and extending upwardly from said fast-forward gear along said first axis, said rotary cylinder having an outer circumferential surface;
a head-cap mounted on said rotary cylinder, said head-cap being adapted to detachably attach a reel thereto, said head-cap having a base section, said base section including an inner circumferential surface, a space being defined between said inner circumferential surface and the outer circumferential surface of said rotary cylinder;
a main gear having a second axis and adapted to be driven by a tape recorder motor;
a second cylinder mounted on said main gear, said second cylinder extending upwardly from said main gear along said second axis and terminating at an upper circumferential end surface, said second cylinder being slidably-fitted in said space between the outer circumferential surface of said rotary cylinder and the inner circumferential surface of said base section of said head-cap of rotation about said rotary cylinder, said second cylinder having an inner circumferential surface;
a coil spring engaging said rotary cylinder, said coil spring including a clamping section circumferentially engaging said outer circumferential surface and a non-clamping section arranged in spaced circumferential relation with said outer circumferential surface, said clamping section having a first engagement end section and said non-clamping section having a second engagement end section;
a holding piece mounted on said inner circumferential surface of said second cylinder for engaging said second engagement end section to move said non-clamping section of said coil spring into engagement with said outer circumferential surface of said rotary cylinder to increase torque applied to said rotary cylinder; and a releasing piece mounted on said upper circumferential end surface of said second cylinder for engaging said first engagement end section to loosen said clamping section of said coil spring to decrease torque applied to said rotary cylinder, said holding piece and said releasing piece cooperating to increase torque applied by said non-clamping section and to decrease torque applied by said clamping section for appling a prescribed fixed total torque by said coil spring to said rotary cylinder.

17. A tape winder as in claim 16, wherein said clamping section of said coil spring has a first diameter, said non-clamping section of said coil spring has a second diameter, and said second diameter is greater than said first diameter, said non-clamping section of said coil spring thereby being arranged in spaced circumferential relation with the outer circumferential surface of said rotary cylinder.

18. A tape winder as in claim 16, wherein said holding piece and said releasing piece are arranged on said second cylinder in spaced circumferential relation.

19. A tape winder as in claim 18, wherein said second cylinder has a plurality of holding pieces arranged on said inner circumferential surface thereof in spaced circumferential relation, each of said holding pieces being arranged in spaced circumferential relation with said releasing piece at a different prescribed angle.

20. A tape winder as in claim 18, said second cylinder further comprising stopper means mounted on said upper circumferential end surface in spaced circumferential relation between said holding piece and said releasing piece, said second engagement end section contacting said holding piece and said first engagement end section contacting said stopper means, said stopper means preventing rotation of said holding piece out of contact with said second engagement end section.

* * * * *